(12) United States Patent
Mizuno et al.

(10) Patent No.: US 11,110,795 B2
(45) Date of Patent: Sep. 7, 2021

(54) VEHICLE CONTROL APPARATUS

(71) Applicant: HONDA MOTOR CO., LTD., Tokyo (JP)

(72) Inventors: Toshiyuki Mizuno, Wako (JP); Takayuki Kishi, Wako (JP); Yoshiaki Konishi, Wako (JP); Makoto Kurihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 295 days.

(21) Appl. No.: 16/299,281

(22) Filed: Mar. 12, 2019

(65) Prior Publication Data

US 2019/0291577 A1 Sep. 26, 2019

(30) Foreign Application Priority Data

Mar. 20, 2018 (JP) .............................. JP2018-053100

(51) Int. Cl.
| | | |
|---|---|---|
| B60K 31/00 | (2006.01) | |
| B60K 31/02 | (2006.01) | |
| B60W 30/165 | (2020.01) | |
| B60W 30/12 | (2020.01) | |

(52) U.S. Cl.
CPC ...... *B60K 31/0008* (2013.01); *B60K 31/0058* (2013.01); *B60K 31/02* (2013.01); *B60W 30/12* (2013.01); *B60W 30/165* (2013.01); *B60K 2031/0025* (2013.01); *B60K 2031/0041* (2013.01); *B60K 2031/0091* (2013.01)

(58) Field of Classification Search
CPC ...................... B60K 31/0008; B60K 31/0058; B60K 31/02; B60K 2031/0041; B60K 2031/0091; B60K 2031/0025; B60W 30/165; B60W 30/12; B60W 2554/804; B60W 2556/65; B60W 2520/10; B60W 30/14; G08G 1/22
See application file for complete search history.

(56) References Cited

U.S. PATENT DOCUMENTS

2004/0111209 A1* 6/2004 Kagawa ................. B60K 31/04
  701/93
2004/0181339 A1* 9/2004 Mukaiyama ........... G08G 1/161
  701/301
2007/0244643 A1* 10/2007 Tengler .................. G08G 1/161
  701/301

(Continued)

FOREIGN PATENT DOCUMENTS

| JP | H10-105880 A | 4/1998 |
| JP | 2004-164433 A | 6/2004 |
| JP | 2014-134897 A | 7/2014 |

*Primary Examiner* — Donald J Wallace
(74) *Attorney, Agent, or Firm* — Thomas | Horstemeyer, LLP

(57) ABSTRACT

A vehicle control apparatus capable of executing control to cause a vehicle to automatically follow a preceding vehicle, includes a determination unit configured to determine, based on internal information of the vehicle, whether to request an increase of a cruising speed of the preceding vehicle during automatic following to the preceding vehicle, and a request transmission unit configured to transmit an increase request for requesting to increase the cruising speed of the preceding vehicle in a case in which the determination unit determines to request the increase of the cruising speed.

7 Claims, 7 Drawing Sheets

(56) References Cited

U.S. PATENT DOCUMENTS

| | | | |
|---|---|---|---|
| 2010/0262343 A1* | 10/2010 | Eriksson | F02D 31/001 |
| | | | 701/54 |
| 2017/0072953 A1* | 3/2017 | Nemoto | B60W 10/04 |
| 2017/0080930 A1* | 3/2017 | Morimoto | B60W 50/14 |
| 2019/0061765 A1* | 2/2019 | Marden | B60W 30/18163 |
| 2019/0092327 A1* | 3/2019 | Osaki | B60W 30/16 |
| 2019/0168732 A1* | 6/2019 | Tashiro | B60W 10/10 |
| 2019/0250639 A1* | 8/2019 | Xu | G08G 1/096827 |

* cited by examiner

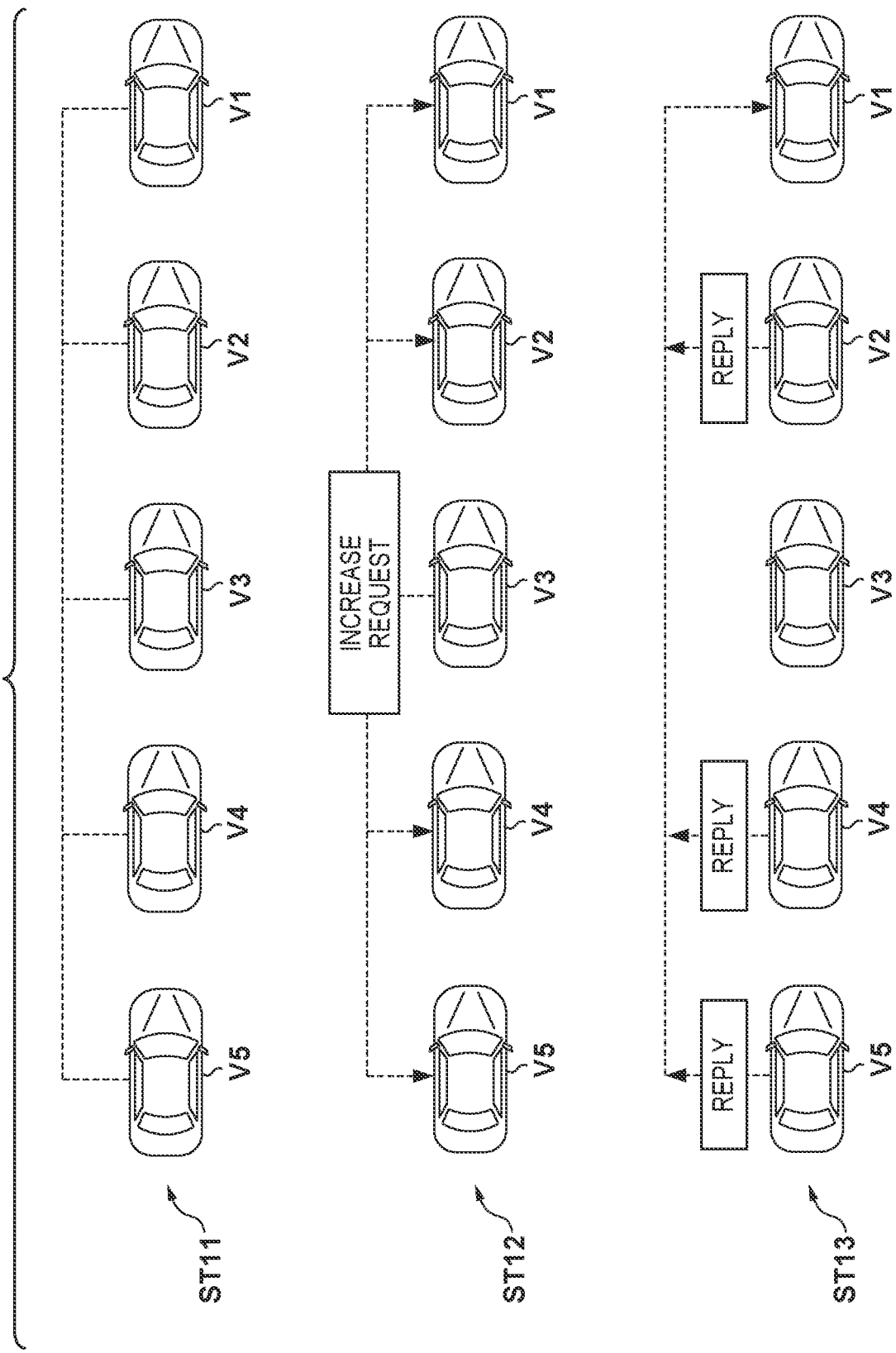

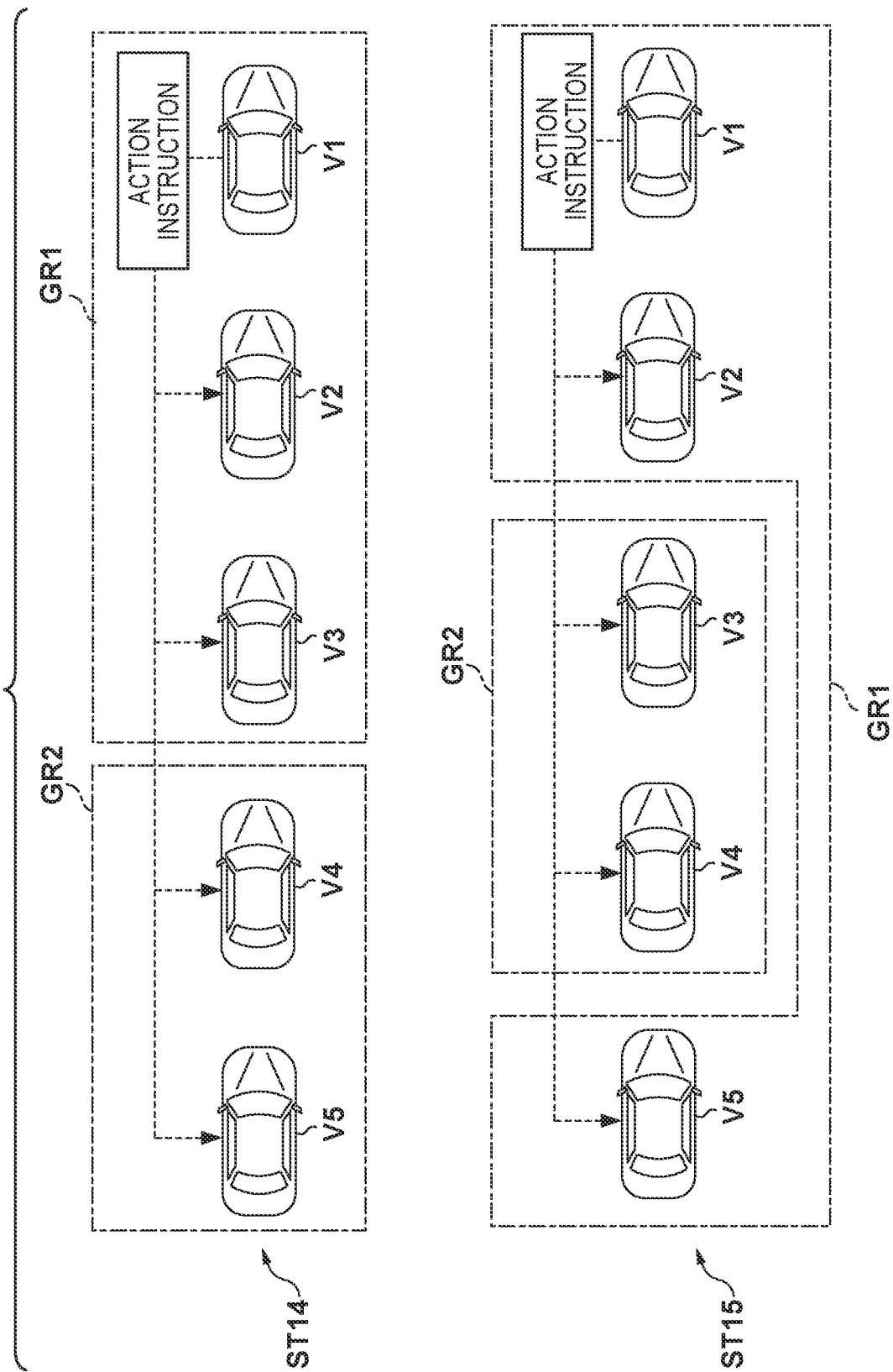

VEHICLE CONTROL APPARATUS

CROSS-REFERENCE TO RELATED APPLICATION(S)

This application claims priority to and the benefit of Japanese Patent Application No. 2018-053100 filed on Mar. 20, 2018, the entire disclosure of which is incorporated herein by reference.

BACKGROUND OF THE INVENTION

Field of the Invention

The present invention relates to a vehicle control apparatus.

Description of the Related Art

There has been proposed a technique of performing communication between vehicles using vehicle-to-vehicle communication or vehicle-to-infrastructure communication. For example, Japanese Patent Laid-Open No. 10-105880 proposes a system that transmits/receives a control request between a preceding vehicle and a following vehicle. Japanese Patent Laid-Open No. 2004-164433 discloses a system that transfers and propagates traffic information and the like between a preceding vehicle and a following vehicle. Japanese Patent Laid-Open No. 2014-134897 proposes a system that transmits a driver's intention and confirms the transmission. These techniques can contribute to automated driving of vehicles.

The automatic following function to a preceding vehicle is advantageous from the viewpoint of reducing a burden on a driver or alleviating traffic jam. However, since the vehicle speed of the self-vehicle needs to match the cruising speed of the preceding vehicle, the vehicle speed is restricted. If the vehicle speed needs to be increased to allow the self-vehicle to do more preferable traveling, the automatic following needs to be stopped, or the self-vehicle needs to maintain the cruising speed of the preceding vehicle even if the cruising speed difference between the self-vehicle and the preceding vehicle is small.

SUMMARY OF THE INVENTION

It is an object of the present invention to improve the degree of freedom of the cruising speed of an automatically following vehicle.

According to an aspect of the present invention, there is provided a vehicle control apparatus capable of executing control to cause a vehicle to automatically follow a preceding vehicle, comprising: a determination unit configured to determine, based on internal information of the vehicle, whether to request an increase of a cruising speed of the preceding vehicle during automatic following to the preceding vehicle; and a request transmission unit configured to transmit an increase request for requesting to increase the cruising speed of the preceding vehicle in a case in which the determination unit determines to request the increase of the cruising speed.

Further features of the present invention will become apparent from the following description of exemplary embodiments with reference to the attached drawings.

BRIEF DESCRIPTION OF THE DRAWINGS

FIG. 6 is an explanatory view of an example of processing in a platooning mode; and FIG. 7 is an explanatory view of an example of processing in a platooning mode.

DESCRIPTION OF THE EMBODIMENTS

Figure 1:
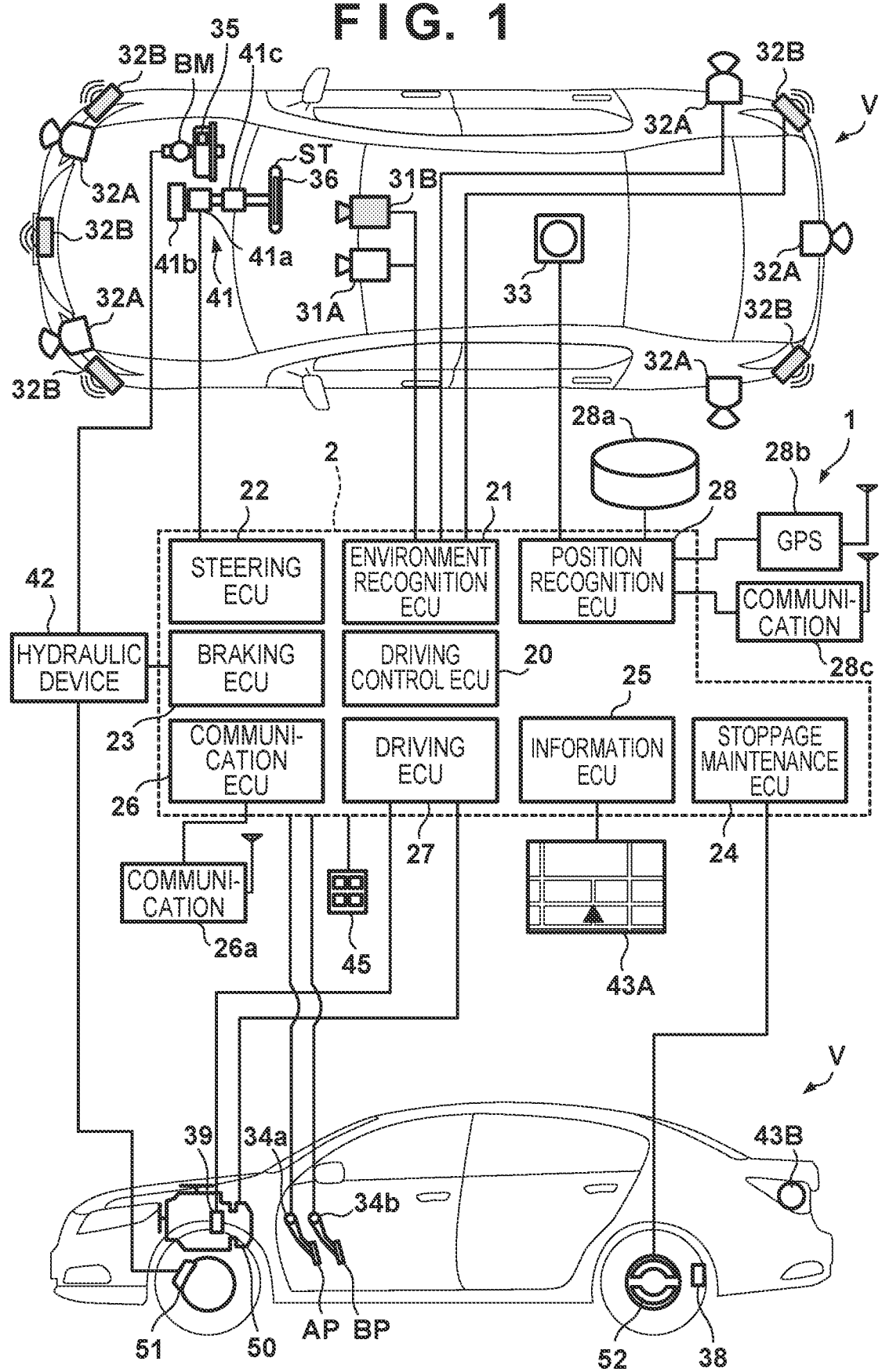
FIG. 1 is a block diagram of a vehicle and a control apparatus according to an embodiment.

FIG. 1 is a block diagram of a vehicle V and a vehicle control apparatus 1 according to an embodiment of the present invention. FIG. 1 shows the schematic arrangement of the vehicle V in a plan view and a side view. As an example, the vehicle V is a sedan-type four-wheeled passenger car.

The vehicle V according to this embodiment is, for example, a parallel-type hybrid vehicle. In this case, a power plant 50 that is a traveling driving unit configured to output a driving force to rotate the driving wheels of the vehicle V can include an internal combustion engine, a motor, and an automatic transmission. The motor can be used as a driving source configured to accelerate the vehicle V and can also be used as a power generator at the time of deceleration or the like (regenerative braking).

<Control Apparatus>

The arrangement of the control apparatus 1 that is an onboard apparatus of the vehicle V will be described with reference to FIG. 1. The control apparatus 1 includes an ECU group (control unit group) 2. The ECU group 2 includes a plurality of ECUs 20 to 28 configured to be communicable with each other. Each ECU includes a processor represented by a CPU, a storage device such as a semiconductor memory, an interface to an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIG. 1, the names of representative functions of the ECUs 20 to 28 are added. For example, the ECU 20 is described as "driving control ECU".

The ECU 20 executes control associated with traveling support including automated driving of the vehicle V. In automated driving, driving (acceleration or the like of the vehicle V by the power plant 50), steering, and braking of the vehicle V are automatically performed without requiring an operation of the driver. Additionally, in manual driving, the ECU 20 can execute, for example, traveling support control such as collision reduction brake or lane departure suppression. In the collision reduction brake, when the possibility of collision against a front obstacle rises, actuation of a brake device 51 is instructed to support collision avoidance. In the lane departure suppression, when the possibility of departure of the vehicle V from the traveling lane rises, actuation of an electric power steering device 41 is instructed to support lane departure. In addition, the ECU 20 can execute automatic following control of causing the vehicle V to follow a preceding vehicle in both automated driving and manual driving. In automated driving, all the acceleration, deceleration, and steering of the vehicle V may be performed automatically. In manual driving, the acceleration and deceleration of the vehicle V may be performed automatically.

The ECU 21 is an environment recognition unit configured to recognize the traveling environment of the vehicle V based on the detection results of detection units 31A, 31B, 32A, and 32B configured to detect the ambient situation of the vehicle V In this embodiment, the detection units 31A and 31B are cameras (to be sometimes referred to as the cameras 31A and 31B hereinafter) that capture the front side of the vehicle V and are provided on the roof front of the vehicle V. When images captured by the cameras 31A and 31B are analyzed, the contour of a target or a division line (a white line or the like) of a lane on a road can be extracted.

In this embodiment, the detection unit 32A is a lidar (Light Detection and Ranging) (to be sometimes referred to as the lidar 32A hereinafter), and detects a target on the periphery of the vehicle V or measures the distance to a target. In this embodiment, five lidars 32A are provided; one at each corner of the front portion of the vehicle V, one at the center of the rear portion, and one on each side of the rear portion. The detection unit 32B is a millimeter wave radar (to be sometimes referred to as the radar 32B hereinafter), and detects a target on the periphery of the vehicle V or measures the distance to a target. In this embodiment, five radars 32B are provided; one at the center of the front portion of the vehicle V, one at each corner of the front portion, and one at each corner of the rear portion.

The ECU 22 is a steering control unit configured to control the electric power steering device 41. The electric power steering device 41 includes a mechanism that steers the front wheels in accordance with the driving operation (steering operation) of the driver on a steering wheel ST. The electric power steering device 41 includes a driving unit 41a including a motor that generates a driving force (to be sometimes referred to as a steering assist torque) to assist the steering operation or automatically steer the front wheels, a steering angle sensor 41b, a torque sensor 41c that detects a steering torque (to be referred to as a steering burden torque) which is discriminated from the steering assist torque) borne by the driver, and the like. The ECU 22 can also acquire the detection result of a sensor 36 configured to detect whether the driver is gripping the steering handle ST, and can monitor the grip state of the driver.

The ECU 23 is a braking control unit configured to control a hydraulic device 42. The braking operation of the driver on a brake pedal BP is converted into a liquid pressure by a brake master cylinder BM and transmitted to the hydraulic device 42. The hydraulic device 42 is an actuator capable of controlling the liquid pressure of hydraulic oil supplied to the brake device (for example, a disc brake device) 51 provided on each of the four wheels based on the liquid pressure transmitted from the brake master cylinder BM, and the ECU 23 drives and controls a solenoid valve and the like provided in the hydraulic device 42. At the time of braking, the ECU 23 can light a brake lamp 43B. This can raise the attention of a following vehicle to the vehicle V.

The ECU 23 and the hydraulic device 42 can form an electric servo brake. The ECU 23 can control, for example, distribution of a braking force by the four brake devices 51 and a braking force by regenerative braking of the motor provided in the power plant 50. The ECU 23 can also implement an ABS function, traction control, and the posture control function of the vehicle V based on the detection results of a wheel speed sensor 38 provided on each of the four wheels, a yaw rate sensor (not shown), and a pressure sensor 35 that detects the pressure in the brake master cylinder BM.

The ECU 24 is a stop maintaining control unit configured to control an electric parking brake device (for example, a drum brake) 52 provided on the rear wheels. The electric parking brake device 52 includes a mechanism that locks the rear wheels. The ECU 24 can control lock of the rear wheels and lock cancel by the electric parking brake device 52.

The ECU 25 is an internal notification control unit configured to control an information output device 43A that notifies information in the vehicle. The information output device 43A includes, for example, a head up display or a display device provided on an instrument panel or a sound output device. The information output device 43A may also include a vibration device. The ECU 25 causes the information output device 43A to output, for example, various kinds of information such as a vehicle speed and an outside temperature, information such as a route guide, and information about the state of the vehicle V.

The ECU 26 includes a communication device 26a for vehicle-to-vehicle communication. The communication device 26a performs wireless communication with another vehicle on the periphery and exchanges information with the vehicle.

The ECU 27 is a driving control unit configured to control the power plant 50. In this embodiment, one ECU 27 is assigned to the power plant 50. However, one ECU may be assigned to each of the internal combustion engine, the motor, and the automatic transmission. The ECU 27, for example, controls the output of the internal combustion engine or the motor or switches the gear of the automatic transmission in correspondence with the vehicle speed or the driving operation of the driver detected by an operation detection sensor 34a provided on an accelerator pedal AP or an operation detection sensor 34b provided on the brake pedal BP. Note that the automatic transmission is provided with a rotation speed sensor 39 configured to detect the rotation speed of the output shaft of the automatic transmission as a sensor that detects the traveling state of the vehicle V. The vehicle speed of the vehicle V can be calculated from the detection result of the rotation speed sensor 39.

The ECU 28 is a position recognition unit configured to recognize the current position or track of the vehicle V. The ECU 28 performs control of a gyro sensor 33, a GPS sensor 28b, and a communication device 28c and information processing of a detection result or a communication result. The gyro sensor 33 detects the rotary motion of the vehicle V. The track of the vehicle V can be determined based on the detection result of the gyro sensor 33 and the like. The GPS sensor 28b detects the current position of the vehicle V. The communication device 28c performs wireless communication with a server that provides map information and traffic information and acquires these pieces of information. A database 28a can store accurate map information. The ECU 28 can more accurately specify the position of the vehicle V on a lane based on the map information and the like.

An input device 45 is arranged inside the vehicle so as to be operable by the driver and receives an instruction or information input by the driver.

<Example of Control>

Figure 2A:
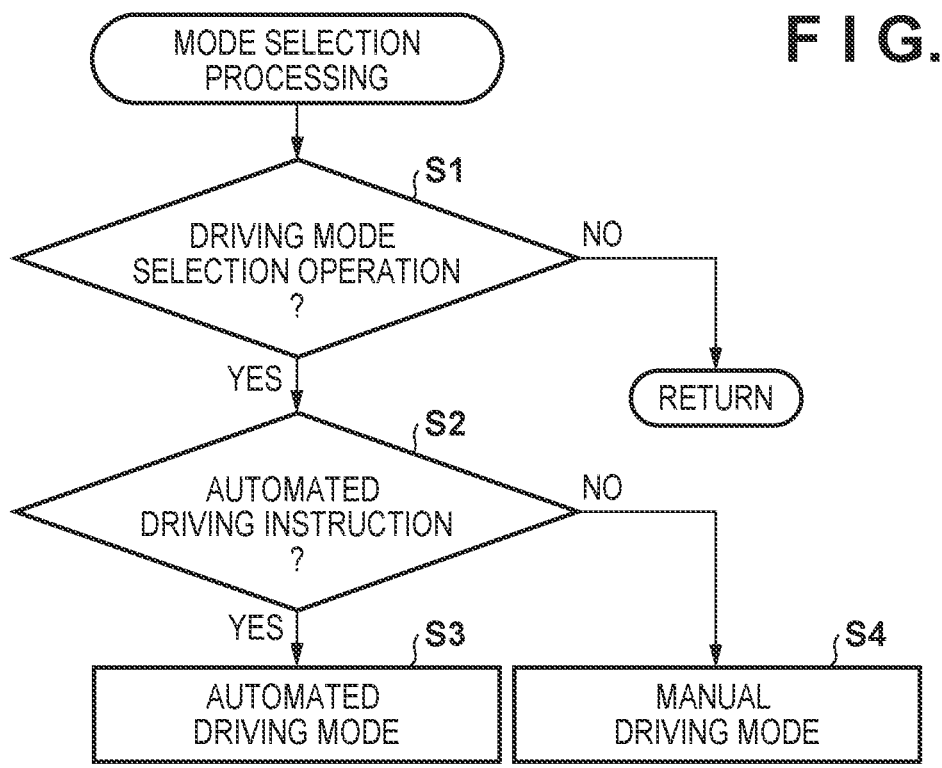
FIGS. 2A and 2B are flowcharts showing an example of processing executed by the vehicle control apparatus shown in FIG. 1.

An example of control of the control apparatus 1 will be described. FIG. 2A is a flowchart showing mode selection processing of driving control executed by the ECU 20.

In step S1, it is determined whether a mode selection operation is performed by the driver. The driver can instruct switching between an automated driving mode and a manual driving mode by, for example, an operation on the input device 45. If a selection operation is performed, the process advances to step S2. Otherwise, the processing ends.

In step S2, it is determined whether the selection operation instructs automated driving. If the selection operation instructs automated driving, the process advances to step S3. If the selection operation instructs manual driving, the process advances to step S4. In step S3, the automated driving mode is set, and automated driving control is started. In step S4, the manual driving mode is set, and manual driving control is started. Current settings concerning the mode of driving control are notified from the ECU 20 to the ECUs 21 to 28 and recognized.

In the automated driving control, the ECU 20 outputs a control instruction to the ECUs 22, 23, and 27 to control the steering, braking, and driving of the vehicle V, thereby automatically making the vehicle V travel without the driving operation of the driver. The ECU 20 sets the traveling route of the vehicle V and causes the vehicle V to travel along the set traveling route by referring to the position recognition result of the ECU 28 or a target recognition result. A target is recognized based on the detection results of the detection units 31A, 31B, 32A, and 32B. If it is possible to follow the preceding vehicle during traveling on an expressway or the like, automatic following control can be executed. In the automatic following control, the vehicle automatically follows the preceding vehicle.

Figure 2B:
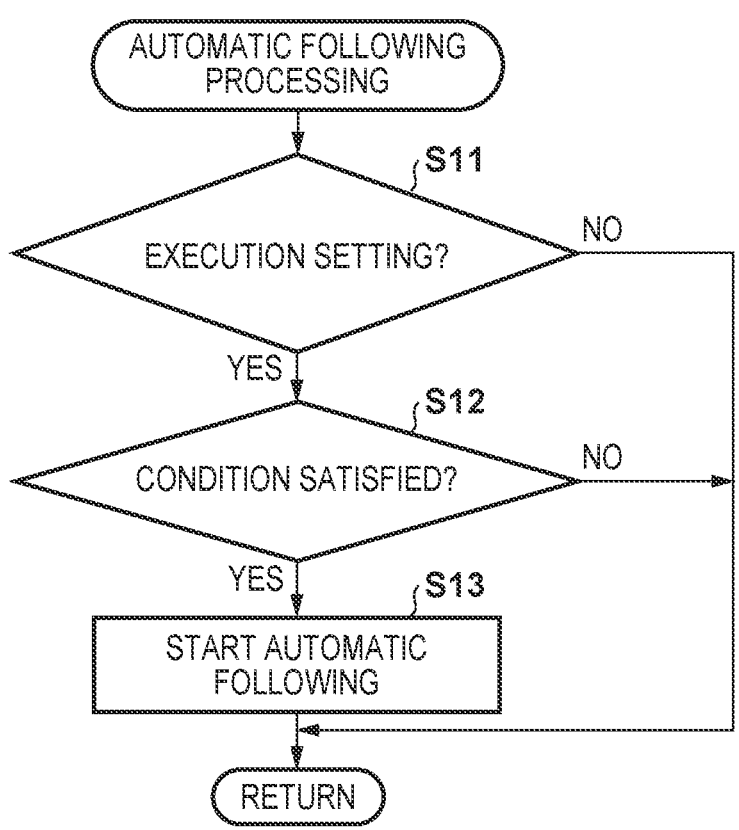

In the manual driving control, driving, steering, and braking of the vehicle V are performed in accordance with the driving operation of the driver, and the ECU 20 executes traveling support control as needed. During the manual driving control as well, automatic following control can be executed as one type of traveling support control. FIG. 2B shows an example of processing of the ECU 20 in a case in which automatic following control is executed during manual driving control.

In step S11, it is determined whether the driver has done a setting to instruct the start of execution of automatic following control. The driver can set the start of execution of automatic following control from, for example, the input device 45. If the start of execution is set, the process advances to step S12. If the start of execution is not set, the processing ends. In step S12, it is determined whether conditions to start automatic following control are satisfied. The conditions include, for example, whether a preceding vehicle as a following target exists. The conditions may include a condition concerning the road representing that, for example, the vehicle is traveling on an expressway. If the conditions are satisfied, the process advances to step S13. If the conditions are not satisfied, the processing ends.

In step S13, automatic following control is started, and the driver is notified that the automatic following control is started. The notification can be done by, for example, the information output device 43A.

<Cruising Speed Change Request and Example of Processing>

In automatic following control, the self-vehicle follows the preceding vehicle while maintaining a predetermined following distance to the preceding vehicle. For this reason, the cruising speed of the self-vehicle depends on the vehicle speed of the preceding vehicle. In some cases, however, it is preferable to increase the cruising speed of the self-vehicle from the viewpoint of fuel consumption, an occupant environment such as a vibration and noise, or an action plan (for example, time to arrival at the destination needs to be shortened). In such a case in which the vehicle speed needs to be increased to allow the self-vehicle to do more preferable traveling, the automatic following control may be canceled to pass the preceding vehicle. However, it is more advantageous to continue automatic following from the viewpoint of monitoring of the driver, reduction of the operation burden, alleviation of traffic jam, and the like.

The control apparatus 1 according to this embodiment has a function of requesting the preceding vehicle to increase the cruising speed when the self-vehicle wants to increase the cruising speed. If the preceding vehicle accepts this, the cruising speeds of both vehicles increase. This can improve the degree of freedom of the cruising speed of the vehicle automatically following the preceding vehicle.

Figure 3:
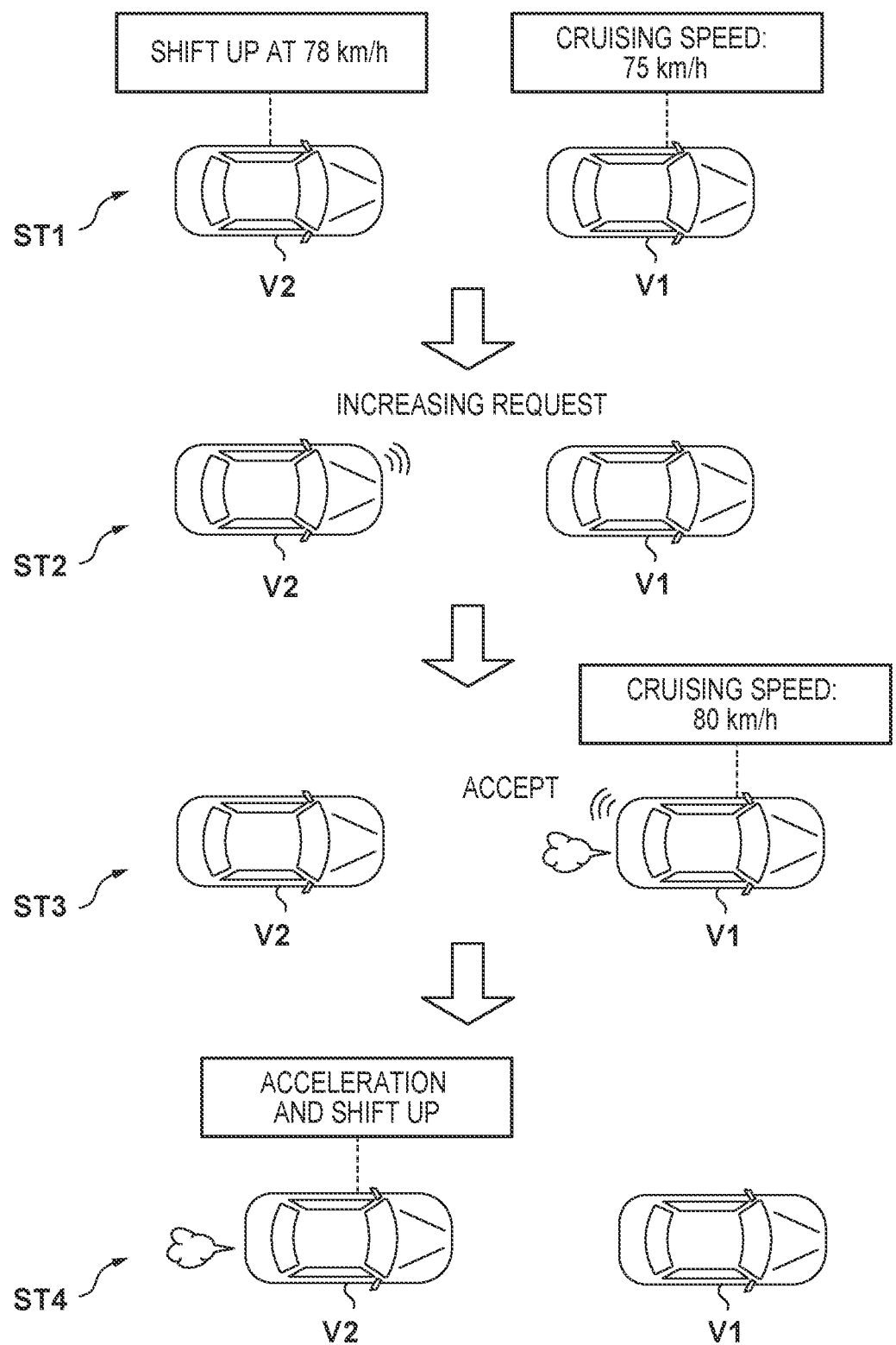
FIG. 3 is an explanatory view of an example of processing of requesting a preceding vehicle to increase the vehicle speed at the time of automatic following.

FIG. 3 is an explanatory view schematically showing an example. A state ST1 shows a state in which a vehicle V2 is automatically following a vehicle V1 that is the preceding vehicle. The vehicle V2 corresponds to the vehicle V as the self-vehicle. The vehicle V1 is cruising by, for example, automated driving while setting the control target value of the cruising speed to 75 km/h. The vehicle V2 includes a stepped automatic transmission, and shifts up at 78 km/h according to the shift map. The shift-up reduces the rotation speed of the internal combustion engine, resulting in advantageous fuel consumption and the like.

Hence, in a state ST2, a cruising speed increase request is transmitted from the vehicle V2 to the vehicle V1. In this embodiment, communication between vehicles is vehicle-to-vehicle communication. However, an arrangement for performing communication between vehicles by vehicle-to-infrastructure communication in which a communication facility at a roadside intervenes may also be employed.

Upon receiving the increase request, the control apparatus of the vehicle V1 determines whether it is possible to increase the vehicle speed. In the example of FIG. 3, in a state ST3, the vehicle V1 returns, to the vehicle V2, a message representing that the request is accepted, and increases the control target value of the cruising speed to 80 km/h to perform acceleration. Accordingly, in a state ST4, the vehicle V2 performs acceleration and shift-up, and the fuel consumption and the like are improved.

<Example of Processing when Transmitting Request>

Figure 4A:
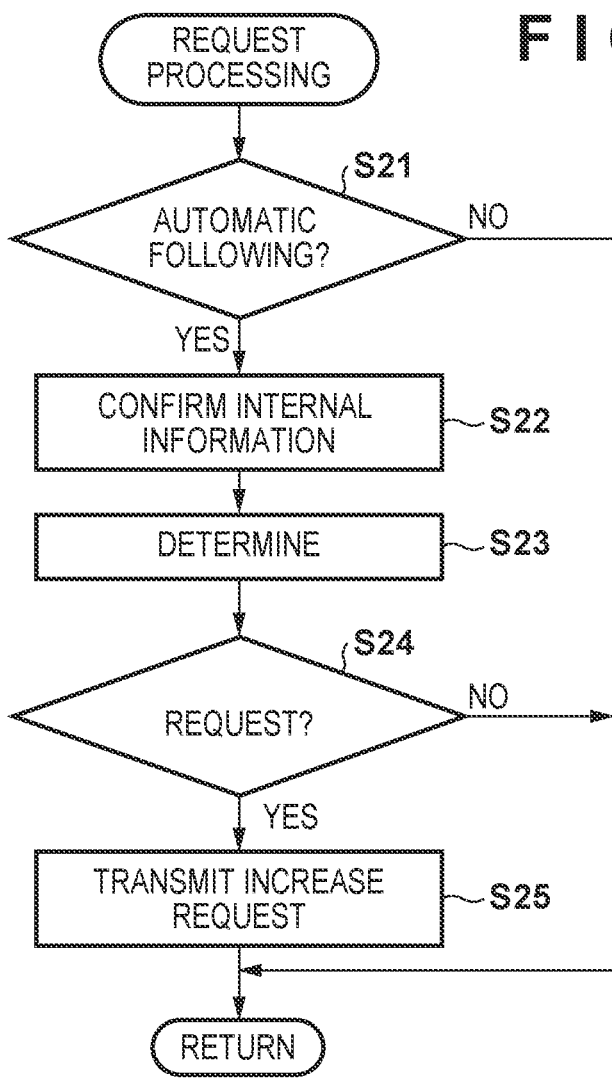
FIG. 4A is a flowchart showing an example of processing executed by the vehicle control apparatus shown in FIG. 1.

FIG. 4A shows an example of processing (request processing) of the ECU 20 performed to transmit the increase request shown in FIG. 3. In step S21, it is determined whether automatic following control is being executed. If the automatic following control is being executed, the process advances to step S22. If the automatic following control is not being executed, the processing ends. In step S22, the internal state of the vehicle V is confirmed. Examples of the internal state are the action plan to the destination and the actuation state of the power plant 50. The action plan to the destination is, for example, the setting of the control target vehicle speed. In addition, examples of the actuation state of the power plant 50 are the rotation speed of the internal combustion engine and the gear ratio of the automatic transmission.

In step S23, it is determined whether to request the preceding vehicle to increase the cruising speed based on the internal information confirmed in step S22. For example, if the target vehicle speed is higher than the cruising speed on the action plan to the destination in the internal information confirmed in step S22, it is determined to request an increase of the cruising speed.

Figure 4B:
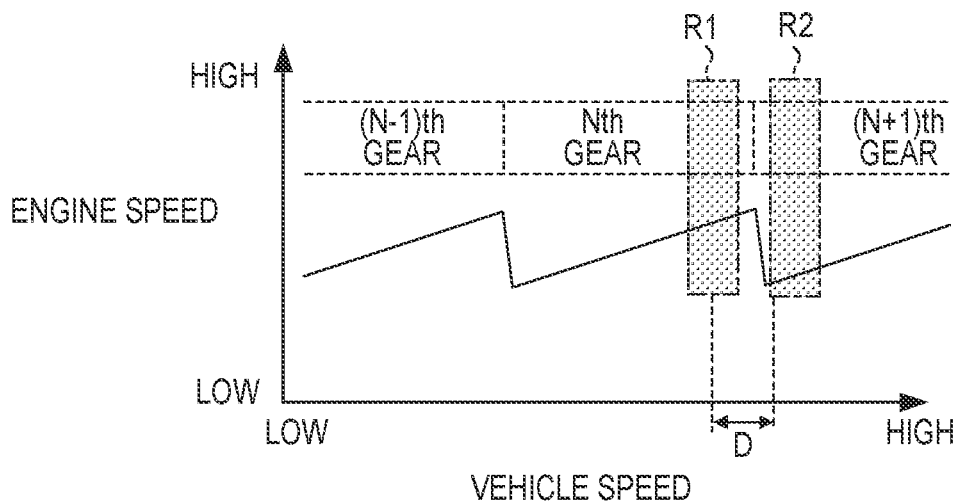
FIG. 4B is an explanatory view showing an example of the actuation state of a traveling driving unit.

Additionally, for example, if an increase of the cruising speed produces an advantageous actuation state of the power plant 50 from the viewpoint of fuel consumption, noise, vibration, and the like in the internal information confirmed in step S22, it is determined to request an increase of the cruising speed. As for whether the actuation state is advantageous or not, comparison information of driving regions can be stored as a map in a storage device provided in the ECU 20 and referred to. FIG. 4B schematically shows an example of comparison information of driving regions.

FIG. 4B schematically shows a fluctuation in the rotation speed (engine speed) of the internal combustion engine in three gears from an (N−1)th gear to an (N+1)th gear to be shifted up in accordance with the vehicle speed in a stepped automatic transmission (for example, a stepped automatic transmission including forward six to 10 gears). Referring to FIG. 4B, a driving region R1 indicates the current driving region of the self-vehicle. In this driving region, the current gear is the Nth gear and as the rotation speed of the internal combustion engine during selection of the Nth gear, the rotation speed is relatively high. When the vehicle speed increases by D km/h on the shift map, the gear is shifted up to the (N+1)th gear, and the rotation speed of the internal combustion engine lowers (driving region R2). An evaluation value concerning at least one of the fuel consumption, noise, vibration, and the like is associated with each of the driving regions R1 and R2. When the evaluation value of the driving region R2 is higher than that of the driving region R1, it can be determined that it is more advantageous to increase the cruising speed.

Referring back to FIG. 4A, in step S24, as the result of the determination in step S23, it is determined whether to request an increase of the cruising speed. Upon determining to request, the process advances to step S25. Upon determining not to request, the processing ends. In step S25, the ECU 26 is instructed to transmit, to the preceding vehicle, an increase request to request an increase of the cruising speed by vehicle-to-vehicle communication, and the ECU 26 transmits the increase request.

The preceding vehicle can be specified by establishing a communication link in advance and exchanging the information of each other's vehicles. Examples of pieces of information to be exchanged are the current position information of the vehicle, the information of a vehicle type, and the information of the vehicle speed. When these pieces of information are exchanged, the preceding vehicle (the ID of its onboard control apparatus, or the like) traveling ahead of the self-vehicle can be specified. The communication link may be established when the automatic following control is started.

The request processing thus ends. In a case in which the increase request is transmitted in step S25, whether or not to respond to the request depends on the preceding vehicle. If the preceding vehicle accepts the increase request, the preceding vehicle accelerates, and the cruising speed increases. Hence, the request of the self-vehicle is met.

Note that the increase request transmitted in step S25 can include the information of a desired cruising speed. The information of the cruising speed may be a speed per hour or may be the information of the increase amount (for example, the vehicle speed difference D in the example of FIG. 4B). This allows the control apparatus of the preceding vehicle to easily determine the target value of the cruising speed and use the information to determine whether the preceding vehicle can accept the increase request.

If a request to largely increase the cruising speed is sent to the preceding vehicle, the possibility of acceptance is considered to become lower. Hence, in the determination of step S23, as a condition, the difference (for example, the vehicle speed difference D in the example of FIG. 4B) between the cruising speed of the preceding vehicle and the target vehicle speed (desired vehicle speed) of the vehicle V that is the self-vehicle may be required to be a predetermined value or less. The predetermined value can be, for example, 10 km/h or 5 km/h.

The increase request transmitted in step S25 can also include information concerning a section to request the increase of the cruising speed. When the section to request the preceding vehicle to increase the cruising speed is limited, the acceptance of the preceding vehicle can easily be obtained in some cases. The section may be specified as a section (the position of a start point to the position of an end point) on a map, may be specified by a distance (for example, the distance from the current position), or may be specified by time (for example, time from the current time).

<Processing Performed Upon Receiving Request>

Figure 5:
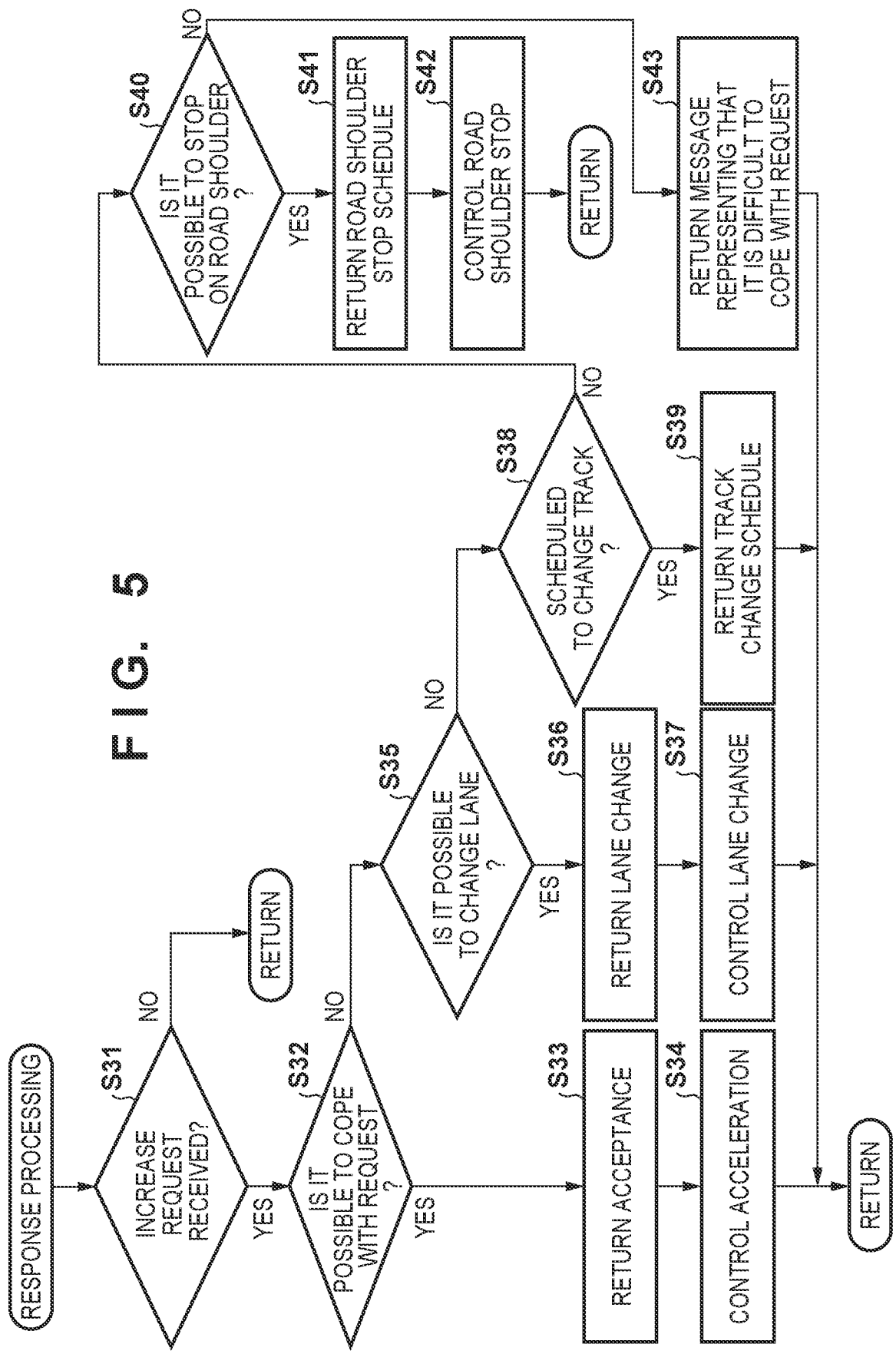
FIG. 5 is a flowchart showing an example of processing executed by the vehicle control apparatus shown in FIG. 1.

In some cases, the vehicle V receives the cruising speed increase request from the control apparatus of a following vehicle during cruising as a preceding vehicle. This is the case of the position of the vehicle V1 shown in FIG. 3. FIG. 5 is a flowchart concerning response processing in a case in which the vehicle V is the preceding vehicle and receives the increase request from the following vehicle, and shows an example of processing of the ECU 20. Assumed here is a case in which the self-vehicle V is cruising by automated driving.

In step S31, it is determined, based on a notification from the ECU 26, whether the increase request is received from the following vehicle. If the increase request is received, the process advances to step S32. If the increase request is not received, the processing ends. In step S32, it is determined whether the vehicle can cope with the increase request, that is, whether the vehicle can increase the cruising speed. Upon determining that the vehicle can cope with the request, the process advances to step S33. Upon determining not to cope with the request, the process advances to step S35.

This determination can be done based on internal information such as an action plan under execution or the actuation state of the power plant 50. For example, if the increase of the cruising speed is not preferable from the viewpoint of the action plan, or if the fuel consumption, noise, and vibration are greatly degraded by the increase of the cruising speed from the viewpoint of the driving region of the power plant 50, it can be determined not to cope with the request. If there is no problem, it can be determined to cope with the request. As for the comparison of the driving regions of the power plant 50, the comparison information described with reference to FIG. 4B may be referred to.

In step S33, the ECU 26 is instructed to return the acceptance of the increase request to the following vehicle by vehicle-to-vehicle communication, and the ECU 26 transmits the acceptance to the control apparatus of the following vehicle. In step S34, the ECU 27 is instructed to execute acceleration control to cope with the increase request received in step S31, and the ECU 27 accelerates the vehicle V to change (increase) the cruising speed. Accordingly, the following vehicle can maintain automatic following while increasing the vehicle speed, and the control apparatus 1 can improve the degree of freedom of the cruising speed of the automatically following vehicle from the position of the preceding vehicle.

If the vehicle cannot cope with the increase request, a message representing this may be returned to the following vehicle to maintain the current cruising speed. In this embodiment, however, the control apparatus takes an action to allow the following vehicle to easily accelerate. In step S35, it is determined whether a lane change is possible. Upon determining that a lane change is possible, the process advances to step S36. Upon determining that a lane change is impossible, the process advances to step S38. For example, in a case in which the vehicle V is cruising on one of a plurality of lanes, and an adjacent lane is vacant, it can be determined that a lane change is possible. If the vehicle is cruising on a single lane, or a lane change is disadvantageous from the viewpoint of the action plan, it can be determined that a lane change is impossible.

In step S36, the ECU 26 is instructed to return a message representing that the vehicle cannot accept the increase request but changes the lane to the following vehicle by vehicle-to-vehicle communication, and the ECU 26 transmits the message to the control apparatus of the following vehicle. In step S37, the ECUs 22 and 27 are instructed to execute the lane change. The ECU 22 controls the electric power steering device 41 while the ECU 27 adjusts the vehicle speed, thereby changing the lane of the vehicle V. This allows the following vehicle to increase the vehicle speed. However, the following vehicle cancels the automatic following control. For this reason, the lane change may be executed in step S37 when the control apparatus of the following vehicle returns a message representing an agreement to the lane change message returned in step S36.

If an action to change the lane cannot be taken, a message representing that the vehicle cannot cope with the increase request may be returned to the following vehicle to maintain the current cruising speed. In this embodiment, however, the control apparatus further takes an action to allow the following vehicle to easily accelerate. In step S38, it is determined whether the self-vehicle V is scheduled to perform a track change after that on the action plan. If the self-vehicle is scheduled to perform a track change, the process advances to step S39. If the self-vehicle is not scheduled to perform a track change, the process advances to step S40. The track change is, for example, a right/left turn or a lane change. The point of the track change to be determined is located within the range of, for example, several km from the current position.

This information is useful for the control apparatus of the following vehicle because in a case of scheduling such a track change, the following vehicle maintains the current cruising speed for a while, and the preceding vehicle then goes away to allow the following vehicle to accelerate. Hence, in step S39, the ECU 26 is instructed to return a message representing that the vehicle cannot accept the increase request but is scheduled to change the track to the following vehicle by vehicle-to-vehicle communication, and the ECU 26 transmits the message to the control apparatus of the following vehicle.

If there is no schedule of a track change, a message representing that the vehicle cannot cope with the increase request may be returned to the following vehicle to maintain the current cruising speed. In this embodiment, however, the control apparatus further takes an action to allow the following vehicle to easily accelerate. In step S40, it is determined whether the self-vehicle V can temporarily stop on a road shoulder. Whether the vehicle can temporarily stop or not can be determined based on the action plan or the peripheral traffic situation. If the vehicle can temporarily stop, the process advances to step S41. If the vehicle cannot temporarily stop, the process advances to step S43. When the vehicle V that is the preceding vehicle temporarily stops on the road shoulder, the following vehicle can pass the preceding vehicle.

Hence, in step S41, the ECU 26 is instructed to return a message representing that the vehicle cannot accept the increase request but temporarily stops on the road shoulder to the following vehicle by vehicle-to-vehicle communication, and the ECU 26 transmits the message to the control apparatus of the following vehicle. In step S42, the ECUs 22, 23, and 27 are instructed to execute the temporary stop. The ECU 22 controls the electric power steering device 41 while the ECUs 23 and 27 adjust the vehicle speed, thereby making the vehicle V pull off and temporarily stop on the road shoulder. This allows the following vehicle to pass the vehicle V that is the preceding vehicle and increase the vehicle speed. However, the following vehicle cancels the automatic following control.

Temporarily stopping the self-vehicle V is disadvantageous for the self-vehicle V in many cases. Hence, in the determination of step S40, it may be determined that the vehicle can temporarily stop in a case in which a condition that, for example, the following vehicle is particularly in a hurry is satisfied. Concerning determining whether the following vehicle is particularly in a hurry, it may be determined that the vehicle is in a hurry when the increase request indicates emergency, or the cruising speed desired in the increase request is largely different from the current cruising speed (for example, there is a difference of several tens of km/h or more). Alternatively, temporary stop control on the road shoulder may be executed in step S42 when the control apparatus of the following vehicle returns a message representing an agreement to the road shoulder stop schedule returned in step S41.

If the temporary stop on the road shoulder is also difficult, in step S43, the ECU 26 is instructed to return a message representing that the vehicle cannot accept the increase request, and the ECU 26 transmits the message to the control apparatus of the following vehicle. The processing thus ends.

<Example of Platooning>

An example of processing performed in a case in which a plurality of vehicles are cruising by platooning will be described with reference to FIGS. 6 and 7. A state ST11 shown in FIG. 6 exemplifies a state in which five vehicles V1 to V5 are cruising by platooning. The vehicle V can be any one of the vehicles V1 to V5. In the state ST11, a communication link schematically indicated by broken lines is established in the five vehicles V1 to V5. The control apparatus of each of the vehicles V1 to V5 recognizes a position at which the self-vehicle is located in the platoon and also recognizes a position at which another vehicle is located in the platoon by exchanging the information of each other's vehicles.

A state ST12 shown in FIG. 6 represents a state in which a cruising speed increase request is transmitted from the control apparatus of the vehicle V3. The increase request is transmitted to all the remaining four vehicles. All the remaining four vehicles determine whether to accept the increase request, and return a reply. In this embodiment, the reply is transmitted to the control apparatus of the first preceding vehicle V1, as indicated by a state ST13 in FIG. 6.

The control apparatus of the first preceding vehicle V1 puts together the determination result of its own and the replies from the other vehicles V2, V4, and V5 and determines the action to be taken. When the control apparatus of the first preceding vehicle V1 puts together the replies and determines the action, the determination processing can be prevented from becoming complex. Then, the control apparatus of the first preceding vehicle V1 instructs the action determination result to the vehicles V2 to V5. The instruction contents are, for example, as follows.

When all the vehicles V1, V2, V4, and V5 accept the cruising speed increase request, the control apparatus of the first preceding vehicle V1 notifies each vehicle of the increase of the cruising speed and accelerates the self-vehicle V1.

If a vehicle that does not accept the cruising speed increase request exists among the vehicles V1, V2, V4, and V5, actions are instructed separately to a group that accepts the request and a group that does not accept the request. In a state ST14 shown in FIG. 7, a group GR1 that accepts the request includes the vehicle V3 that is the increase request transmission source and the vehicles V1 and V2 that accept the request, and a group GR2 that does not accept the request includes the vehicles V4 and V5. In this case, the control apparatus of the first preceding vehicle V1 notifies the control apparatuses of the vehicles V2 and V3 of the increase of the cruising speed and accelerates the self-vehicle V1. The control apparatus instructs the control apparatuses of the vehicles V4 and V5 to separate from the platoon, and the vehicles V4 and V5 travel together.

It is easy to divide the five vehicles V1 to V5 into two groups, as in the state ST14. However, in some cases, it is impossible to divide them into two groups. In the example of a state ST15, the group GR1 that does not accept the request includes the vehicles V1, V2, and V5, and the group GR2 that accepts the request includes the vehicle V3 that is the increase request transmission source and the vehicle V4 that accepts the request. In the case of this example, as a considerable action, the group GR1 performs a lane change, the group GR1 temporarily stops on the road shoulder, the group GR1 notifies the group GR2 that there is a schedule of a track change, the group GR2 changes the lane and separates from the platoon, or the current state is maintained.

Since the control apparatus of the first preceding vehicle V1 determines for each group whether a lane change is possible, the replies shown in the state ST13 of FIG. 6 or the increase request shown in the state ST12 of FIG. 6 can include the information of options that can be taken by each vehicle. The control apparatus of the first preceding vehicle V1 can determine the action by specifying the common contents of the options presented by the vehicles.

<Summary of Embodiment>

1. A vehicle control apparatus (for example, 1) according to the above-described embodiment is a vehicle control apparatus capable of executing control to cause a vehicle to automatically follow a preceding vehicle, comprising:

a determination unit (for example, 20, S23) configured to determine, based on internal information of the vehicle, whether to request an increase of a cruising speed of the preceding vehicle during automatic following to the preceding vehicle; and a request transmission unit (for example, 20, 26, 26a, S25) configured to transmit a request to increase the cruising speed of the preceding vehicle in a case in which the determination unit determines to request the increase of the cruising speed.

According to this embodiment, when the self-vehicle requests the preceding vehicle to increase the cruising speed, the preceding vehicle can be expected to respond to this, and the degree of freedom of the cruising speed of the automatically following vehicle can be improved.

2. In the above-described embodiment, the internal information is information of an actuation state of a traveling driving unit (for example, 50) of the vehicle.

According to this embodiment, it is possible to request the preceding vehicle to perform an increase of a cruising speed advantageous for the self-vehicle concerning the fuel consumption, vibration, noise, and the like.

3. In the above-described embodiment, the traveling driving unit includes an internal combustion engine and an automatic transmission.

According to this embodiment, it is possible to request the preceding vehicle to perform an increase of a cruising speed advantageous for the self-vehicle concerning the fuel consumption, vibration, noise, and the like.

4. In the above-described embodiment, the automatic transmission comprises a stepped automatic transmission, and the actuation state includes an engine speed of the internal combustion engine and a gear of the automatic transmission (for example, FIG. 4B).

According to this embodiment, it is possible to request an increase of a cruising speed that facilitates selection of the engine speed or the gear advantageous for the self-vehicle.

5. In the above-described embodiment, the determination unit determines to request the increase of the cruising speed in a case in which when a vehicle speed of the vehicle increases, the automatic transmission is shifted up, and the engine speed of the internal combustion engine lowers (for example, R1→R2).

According to this embodiment, it is possible to request an increase of a cruising speed that facilitates selection of the engine speed or the gear advantageous for the self-vehicle.

6. In the above-described embodiment, the determination unit determines to request the increase of the cruising speed on condition that a difference between the cruising speed of the preceding vehicle and a target vehicle speed of the vehicle is not more than a predetermined value.

According to this embodiment, it is possible to cause the preceding vehicle to easily accept the increase request.

7. In the above-described embodiment, the request transmission unit transmits the increase request to the preceding vehicle by vehicle-to-vehicle communication.

According to this embodiment, the degree of freedom of the cruising speed of the automatically following vehicle can be improved without needing a communication relay device at a roadside.

8. In the above-described embodiment, the apparatus further comprises:

a request reception unit (for example, 26, 26a) configured to receive a request to request the vehicle to increase the cruising speed; and a traveling control unit (for example, 20, 27, S34) configured to accelerate the vehicle in a case in which it is possible to cope with the request received by the request reception unit.

According to this embodiment, the degree of freedom of the cruising speed of the automatically following vehicle can be improved from the position of the preceding vehicle.

9. In the above-described embodiment, in a case in which it is difficult to cope with the request, and a lane change of the vehicle is possible, the traveling control unit causes the vehicle to perform the lane change (for example, 20, 22, 27, S37).

According to this embodiment, when the apparatus cannot cope with the increase in the cruising speed, it is possible to give the opportunity of passing to the following vehicle.

10. In the above-described embodiment, the apparatus further comprises a return unit (for example, 20, 26, 26a, S39) configured to return, in response to the request, information representing that a track change is scheduled in a case in which it is difficult to cope with the request, and the track change is to be performed later based on an action plan of the vehicle.

According to this embodiment, it is possible to notify the following vehicle that when the following vehicle maintains the current cruising speed for a while, the preceding vehicle goes away to allow the following vehicle to accelerate.

11. In the above-described embodiment, in a case of platooning by a plurality of vehicles, the request transmission unit (for example, 20, 26, 26a, S25) transmits the increasing request to each vehicle that forms a platoon (for example, ST12).

According to this embodiment, it is possible to notify each vehicle of the platoon of the vehicle speed increase request.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A vehicle control apparatus capable of executing control to cause a vehicle to automatically follow a preceding vehicle, comprising:
   a controller including at least one processor and at least one storage device and configured to perform
      determining, based on internal information of the vehicle, whether to request an increase of a cruising speed of the preceding vehicle during automatic following to the preceding vehicle; and
      transmitting an increase request for requesting to increase the cruising speed of the preceding vehicle in a case in which it is determined in the determining to request the increase of the cruising speed,
   wherein in the determining, it is determined to request the increase of the cruising speed on condition that a difference between the cruising speed of the preceding vehicle and a desired vehicle speed of the vehicle, which is higher than a current vehicle speed of the vehicle, is not more than a predetermined value.

2. The apparatus according to claim 1, wherein the internal information is information of an actuation state of a traveling driving unit of the vehicle.

3. The apparatus according to claim 2, wherein the traveling driving unit includes an internal combustion engine and an automatic transmission.

4. The apparatus according to claim 3, wherein the automatic transmission comprises a stepped automatic transmission, and
   the actuation state includes an engine speed of the internal combustion engine and a gear of the automatic transmission.

5. The apparatus according to claim 4, wherein in the determining, it is determined to request the increase of the cruising speed in a case in which when a vehicle speed of the vehicle increases, the automatic transmission is shifted up, and the engine speed of the internal combustion engine lowers.

6. The apparatus according to claim 1, wherein the increase request to the preceding vehicle is transmitted by vehicle-to-vehicle communication.

7. The apparatus according to claim 1, wherein in a case of platooning by a plurality of vehicles, the increase request is transmitted to each vehicle that forms a platoon in the transmitting.

* * * * *